Aug. 31, 1965   O. MIDDLEBROOKS   3,203,767
APPARATUS FOR PRODUCING CARBON BLACK
Filed May 18, 1962   3 Sheets-Sheet 1

INVENTOR,
Ollie Middlebrooks
by
Robert U. Geil, Jr.
Attorney

Aug. 31, 1965   O. MIDDLEBROOKS   3,203,767
APPARATUS FOR PRODUCING CARBON BLACK
Filed May 18, 1962   3 Sheets-Sheet 3

INVENTOR,
Ollie Middlebrooks

Robert U. Geil, Jr.
Attorney

United States Patent Office 3,203,767
Patented Aug. 31, 1965

3,203,767
APPARATUS FOR PRODUCING CARBON BLACK
Ollie Middlebrooks, Houston, Tex., assignor to Continental Carbon Company, Houston, Tex., a corporation of Delaware
Filed May 18, 1962, Ser. No. 195,702
4 Claims. (Cl. 23—259.5)

This invention relates to the production of carbon black in gas furnaces and particularly to the control of the size of the particles obtainable thereby.

There are, of course, a number of well-known processes for obtaining carbon black, the yield in particle size and cost of operation varying widely as between them. The finest gas black is known as V.FF (20 M/U diameter) and the coarsest as SRF (70–90 M.U. diameter).

Some of the earlier gas black burners provided for the incomplete combustion of natural gas within a combustion chamber into which the gas and air were directed in a plurality of alternate wide and relatively thick layers or sheets moving at low and substantially the same velocity so that laminar flow occurred with a low air-gas mixing rate. Such gas black burners produced coarse particle gas furnace black (SRF). The gas and air at the layer interface first mix and burn radiating heat to the inner core of the gas layers causing this remaining gas to crack. With this earlier type of burner the cracking action takes place relatively slowly giving more time for particle growth, and thereby resulting in a relatively large particle size black. Such burners were later re-designed to introduce the gas in thinner and more numerous streams of higher relative velocity (compared to air velocity). Accordingly, turbulent interface between the gas and air was relatively larger thereby causing more rapid mixing and combustion of gas and air and also more rapid cracking of the remaining gas with less time for the carbon black particles to grow, thereby resulting in a gas black of smaller particle size.

It is among the objects of the present invention to provide a novel and improved method and apparatus for producing gas furnace black according to which the average particle size can be efficiently controlled throughout the range from the finest gas black V.FF (20 M/U diameter) to the coarsest gas blacks SRF (70–90 M.U. diameter).

Another object is the provision of a method and apparatus of the class described which is relatively simple and inexpensive.

The foregoing and other objects and advantages of the invention will become apparent upon full consideration of the following detailed description and accompanying drawings, in which FIGURE 1 is a longitudinal elevation, partly in section of an apparatus embodying the teachings of the present invention;

Figure 1:
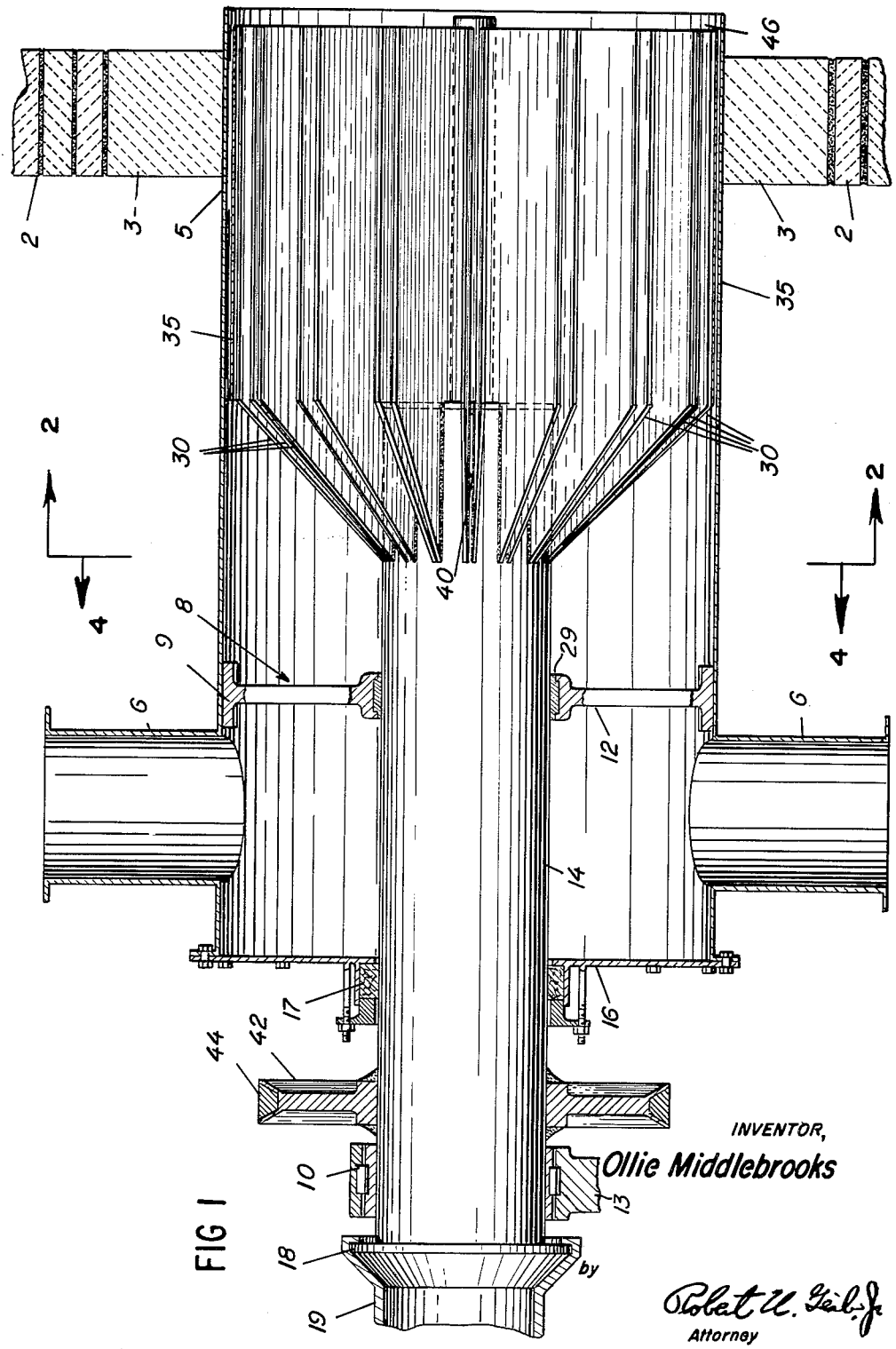

Referring more particularly to the drawings, the numeral 2 generally designates the refractory wall of a conventional carbon black furnace, the same being provided with a series of radially disposed firebricks 3 which define a cylindrical burner opening or bull's-eye.

A cylindrical metallic burner housing 5 extends into the aforementioned opening or bull's-eye with its inner end terminating flush with the interior surface of the furnace. The other end of the cylindrical burner housing 5 projects from the furnace wall for a substantial distance and is provided with a radial air inlet 6 adjacent its upstream end.

Disposed within the cylindrical metallic burner housing 5, and relatively adjacent its radial air inlet 6, is a spider 8, the legs of which extend radially and are provided with feet 9 on their outer extremities which make contact with the interior wall of the said burner housing.

The center of the spider 8 receives a bearing 29 which is aligned with a similar bearing 10 mounted on a channel support 13 which is disposed exteriorly of, and upstream with respect to, the cylindrical burner housing 5. A rotary pipe 14 is journaled in the bearings 29 and 10, passing through a removable and centrally apertured access plate 16 adjacent the air inlet 6, the said access plate being provided around its central aperture with a packing gland 17 which effects a sealing relationship with the exterior of said rotary pipe.

Adjacent the bearing 10 and its channel support 13 is a ring seal 18 which couples the upstream end of the rotary pipe 14 to a pipe 19 which supplies fuel gas to be burned in a manner which will be described hereinafter.

The downstream end of the rotary pipe 14 projects from the bearing 29, terminates short of a vertical plane occupied by the exterior of the furnace wall, and carries an end closure plate 20.

A shaft 22 which is in axial alignment with the rotary pipe 14 is secured to, and carried by the closure plate 20, the extending end of said shaft terminating adjacent a vertical plane along the interior of the furnace wall, as shown at the right-hand end of FIGURE 1.

That portion of the rotary pipe 14 which is between the closure plate 20 and the bearing 29 is provided with a series of radially and longitudinally extending burner vanes or segments 30.

Figure 2:
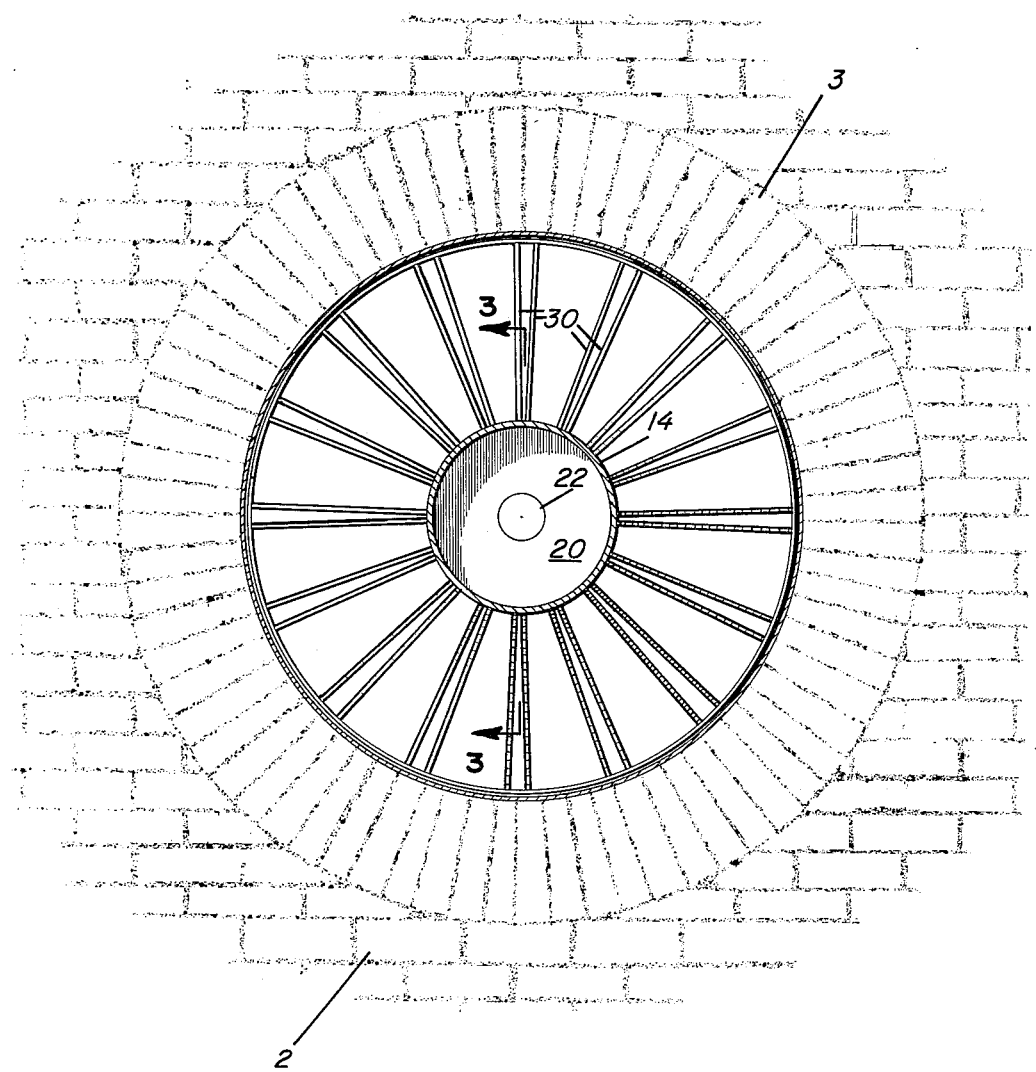
FIGURE 2 is a sectional view taken on the line 2—2 of FIGURE 1.
Figure 3:
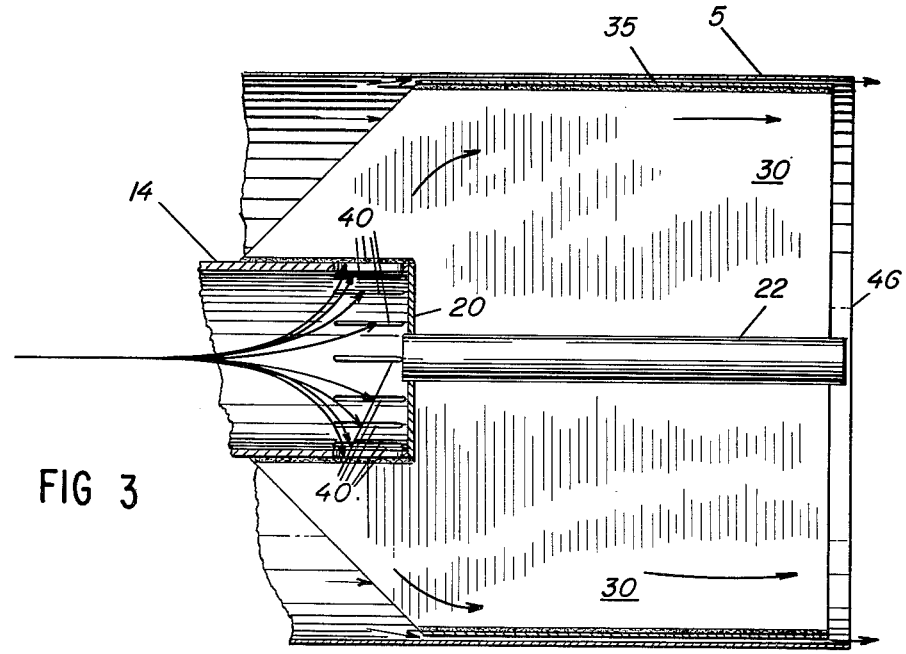
FIGURE 3 is an enlarged elevational view, partly in section and illustrating one of the vanes or segments of the burner which will be more fully described hereinafter.
Figure 4:
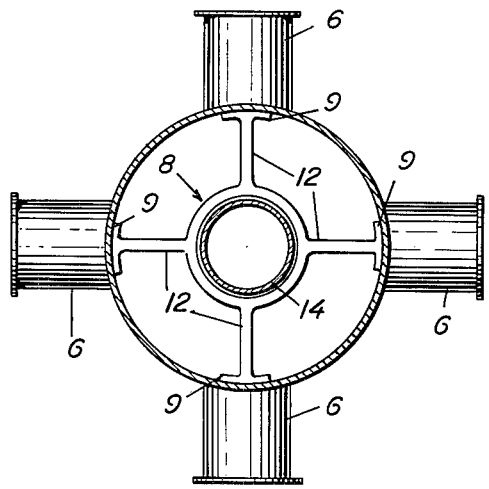
FIGURES 4 and 5 are elevational views of other details of the apparatus.
Figure 5:
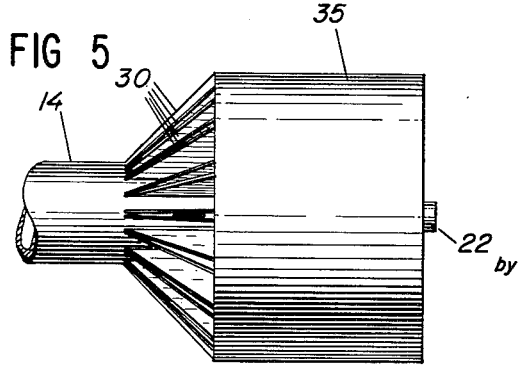

These burner vanes or segments 30 are arranged in pairs, sixteen of such pairs being illustrated in FIGURE 2, The inner edges of the upstream portions of the burner vanes 30 are welded to the rotary pipe 14, the corresponding outer edges extending from said pipe at an angle of approximately 45°. From a position which is proximate a vertical plane occupied by the inner end of the shaft 22, the radially and longitudinally extending burner vanes or segments 30 become substantially rectangular in shape with their inner edges supported by the shaft 22 and their outer edges welded to the inner wall of a metallic cylindrical cage 35.

The outer diameter of the metallic cylindrical cage 35 closely approximates the inside diameter of the burner opening or bull's-eye in the furnace wall 2.

Those peripheral portions of the rotary pipe 14 which are disposed between a closely adjacent pair of burner vanes or segments 30 are provided with a series of juxtaposed slots 40 through which fuel gas is supplied by the fuel gas pipe 19.

The wider spaces between the various pairs of burner vanes or segments 30 receive combustion air from the radial air inlet 6 of the cylindrical burner housing 5.

A sheave or pulley 42 is secured to the rotary pipe 14 at a position which is between the packing gland 17 and the bearing 10; and rotation is imparted to it by a V-belt 44, the latter being driven by an adjustable speed motor, such as a variable speed electric motor (not shown).

The fuel gas from the gas pipe (usually natural gas) is partially burned and the remainder cracked to carbon black; the gas finally emerging from the gas sectors formed by the adjacent pairs of burner vanes or segments 30 and being finally discharged through the open face 46 of the burner which is exposed to the interior of the furnace.

A small portion of the combustion air which is supplied to the air sectors which are disposed intermediate the gas sectors passes between the metallic cylindrical cage 35 and the metallic cylindrical burner housing 5 and serves to effectively cool the cylindrical cage, the remainder being finally discharged through the open face 46 of the burner. As the air-gas ratio usually employed averages around As the air-gas ratio usually employed averages around 4.6 to 1 (with 1200 B.t.u./s.c.f. natural gas) the burner is preferably so fabricated that the gas sector angle is 4° and the air sector angle is 18.5°. Thus, the gas and air enter the combustion chamber of the furnace in alternate sectors at approximately the same velocity. When the burner is operated without rotation of the movable element, the air and gas are introduced with a minimum rate of mixing between the air and gas sectors. Therefore, the air-gas mixture that does burn along the radial air-gas interfaces radiates heat to gas that has not burned, thereby causing gradual cracking and a maximum chance for carbon black particle growth. As the rotary pipe 14 and associated elements are rotated at an increasing speed, more and more turbulent mixing occurs between the gas and air immediately before or during combustion. The whole combustion and cracking reaction takes place at a progressively increasing rate with a corresponding decrease in the particle size of the carbon black formed thereby because there is less time for particle growth during the cracking action. Without imparting rotation to the rotary burner of the present invention, there results a carbon black of maximum particle size (i.e. somewhat larger particle than SRF). At burner speed of 100 r.p.m. the carbon size reaches a minimum particle size closely approaching to V.FF. Some tests demonstrated that increases in rotational speed of the burner beyond 100 r.p.m. would not of itself result in appreciable decrease in particle size. However, carbon blacks of smaller particle size were obtained by increasing the air-gas ratio as high as 6 to 1 but with an accompanying reduction in yield.

While I have shown and described certain specific embodiments of the present invention, it will be readily understood that I do not wish to be limited exactly thereto, since various modifications may be made without departing from the scope of the invention as defined in the appended claims.

What I claim is:

1. Apparatus for producing carbon black by partial combustion of hydrocarbon gas, said apparatus comprising a gas furnace having a cylindrical opening in one of the walls thereof; a cylindrical metallic housing disposed in said cylindrical opening and extending longitudinally outward from the wall of said furnace; a rotatable tube concentrically disposed in said cylindrical metallic housing; said rotatable tube having an axial extension which terminates adjacent the interior surface of the wall of said furnace; a series of substantially rectangular vanes extending radially from the extension on said rotatable tube; a cylindrical metallic cage surrounding the outer edges of said radial vanes and secured thereto; the outside diameter of said cylindrical metallic cage being slightly less than the inside diameter of said cylindrical metallic housing; of apertures; a series of divider plates extending radially from said rotatable tube; the inner edge of each of said divider plates being substantially parallel with the exterior of said rotatable tube; the outer edge of each of said divider plates defining an angle of approximately 45° with respect to the axis of said rotatable tube; said divider plates being the same in number as said aforementioned radial vanes and in aligned relationship with respect thereto; said rotatable tube having an aperture disposed between every other divider plate; means for supplying hydrocarbon gas to the interior of said rotatable tube; means for supplying combustion air to the interior of said cylindrical metallic housing, but exteriorly of said rotatable tube; and means for rotating said rotatable tube.

2. Apparatus for producing carbon black by partial combustion of hydrocarbon gas, said apparatus comprising a gas furnace having a cylindrical opening in one of the walls thereof; a cylindrical metallic housing disposed in said cylindrical opening and extending longitudinally outward from the wall of said furnace; a rotatable tube concentrically disposed in said cylindrical metallic housing; said rotatable tube having an axial extension which terminates adjacent the interior surface of the wall of said furnace; a series of substantially rectangular vanes extending radially from the extension on said rotatable tube; a cylindrical metallic cage surrounding the outer edges of said radial vanes and secured thereto; the outside diameter of said cylindrical metallic cage being slightly less than the inside diameter of said cylindrical metallic housing; a series of divider plates extending radially from said rotatable tube; the inner edge of each of said divider plates being substantially parallel with the exterior of said rotatable tube; the outer edge of each of said divider plates defining an angle of approximately 45° with respect to the axis of said rotatable tube; said divider plates being the same in number as said aforementioned radial vanes and in aligned relationship with respect thereto; said rotatable tube having an aperture disposed between every other divider plate; means for supplying hydrocarbon gas to the interior of said rotatable tube; means for supplying combustion air to the interior of said cylindrical metallic housing, but exteriorly of said rotatable tube; means for rotating said rotatable tube; and means for adjusting the speed of said last-named means.

3. Apparatus for producing carbon black by partial combustion of hydrocarbon gas, said apparatus comprising a gas furnace having a cylindrical opening in one of the walls thereof; a cylindrical metallic housing disposed in said cylindrical opening and extending longitudinally outward from the wall of said furnace; a rotatable tube concentrically disposed in, and extending outwardly from, said cylindrical metallic housing; aligned bearings for said rotatable tube; one of said bearings being disposed within said cylindrical metallic housing; the other of said bearings being disposed exteriorly of said cylindrical metallic housing; said rotatable tube having an axial extension which terminates adjacent the interior surface of the wall of said furnace; a series of substantially rectangular vanes extending radially from the extension on said rotatable tube; a cylindrical metallic cage surrounding the outer edges of said radial vanes and secured thereto; the outside diameter of said cylindrical metallic cage being slightly less than the inside diameter of said cylindrical metallic housing; a series of divider plates extending radially from said rotatable tube; the inner edge of each of said divider plates being substantially parallel with the exterior of said rotatable tube; the outer edge of each of said divider plates defining an angle of approximately 45° with respect to the axis of said rotatable tube; said divider plates being the same in number as said aforementioned radial vanes and in aligned relationship with respect thereto; said rotatable tube having an aperture disposed between every other divider plate; means for supplying hydrocarbon gas to the interior of said rotatable tube; means for supplying combustion air to the interior of said cylindrical metallic housing, but exteriorly of said rotatable tube; and means for rotating said rotatable tube.

4. Apparatus for producing carbon black by partial combustion of hydrocarbon gas, said apparatus comprising a gas furnace having a cylindrical opening in one of the walls thereof; a cylindrical metallic housing disposed in said cylindrical opening and extending longitudinally outward from the wall of said furnace; a rotatable tube concentrically disposed in, and extending outwardly from, said cylindrical metallic housing; aligned bearings for said rotatable tube; one of said bearings being disposed within said cylindrical metallic housing; the other of said bearings being disposed exteriorly of said cylindrical metallic housing; said rotatable tube having an axial extension which terminates adjacent the interior surface of the wall of said furnace; a series of substantially rectangular vanes extending radially from the extension on said rotatable tube; a cylindrical metallic cage surrounding the outer edges of said radial vanes and secured thereto; the outside diameter of said cylindrical metallic cage being slightly less than the inside diameter of said cylindrical metallic housing; a series of divider plates extending radially from said rotatable tube; the inner edge of each of said divider plates being substantially parallel with the exterior of said rotatable tube; the outer edge of each of said divider plates defining an angle of approximately 45° with respect to the axis of said rotatable tube; said divider plates being the same in number as said aforementioned radial vanes and in aligned relationship with respect thereto; said rotatable tube having an aperture disposed between every other divider plate; means for supplying hydrocarbon gas to the interior of said rotatable tube; means for supplying combustion air to the interior of said cylindrical metallic housing, but exteriorly of said rotatable tube; means for rotating said rotatable tube; and means for adjusting the speed of said last-named means.

References Cited by the Examiner
UNITED STATES PATENTS 2,976,128    3/61    Latham et al. _____ 23—209.6 X
3,033,651    5/62    Latham et al. _____ 23—209.4

MAURICE A. BRINDISI, *Primary Examiner.*